United States Patent
Hackenschmied et al.

(10) Patent No.: US 8,389,928 B2
(45) Date of Patent: Mar. 5, 2013

(54) X-RAY DETECTOR COMPRISING A DIRECTLY CONVERTING SEMICONDUCTOR LAYER AND CALIBRATION METHOD FOR SUCH AN X-RAY DETECTOR

(75) Inventors: Peter Hackenschmied, Nürnberg (DE); Christian Schröter, Bamberg (DE); Matthias Strassburg, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 9 days.

(21) Appl. No.: 13/088,448

(22) Filed: Apr. 18, 2011

(65) Prior Publication Data
US 2011/0253886 A1    Oct. 20, 2011

(30) Foreign Application Priority Data
Apr. 19, 2010    (DE) .......................... 10 2010 015 422

(51) Int. Cl.
G01D 18/00    (2006.01)
(52) U.S. Cl. .................................................. 250/252.1
(58) Field of Classification Search ............... 250/252.1, 250/370.01–370.15; 378/98.8
See application file for complete search history.

(56) References Cited

U.S. PATENT DOCUMENTS

| | | | | |
|---|---|---|---|---|
| 5,530,238 A | * | 6/1996 | Meulenbrugge et al. | 250/208.1 |
| 5,886,353 A | * | 3/1999 | Spivey et al. | 250/370.09 |
| 5,905,772 A | * | 5/1999 | Rutten et al. | 378/98.8 |
| 7,064,082 B2 | * | 6/2006 | Polichar et al. | 438/745 |
| 7,211,818 B2 | * | 5/2007 | Imai et al | 250/586 |
| 2003/0058998 A1 | | 3/2003 | Aufrichtig et al. | |
| 2005/0161610 A1 | | 7/2005 | Spahn | |
| 2008/0164418 A1 | | 7/2008 | El-Hanany | |
| 2010/0086098 A1 | * | 4/2010 | Shahar et al. | 378/4 |

FOREIGN PATENT DOCUMENTS

| | | |
|---|---|---|
| DE | 10244404 A1 | 5/2003 |
| DE | 10332834 B4 | 5/2005 |
| DE | 19906029 B4 | 8/2005 |
| DE | 102004003881 A1 | 8/2005 |
| EP | 0440 864 | 8/1991 |
| JP | 59-46573 | 3/1984 |

OTHER PUBLICATIONS

German Office Action dated Aug. 14, 2012.

* cited by examiner

*Primary Examiner* — Kiho Kim
(74) *Attorney, Agent, or Firm* — Harness, Dickey & Pierce, PLC

(57) ABSTRACT

An X-ray detector includes a directly converting semiconductor layer for converting an incident radiation into electrical signals with a band gap energy characteristic of the semiconductor layer, and at least one light source for coupling light into the semiconductor layer, wherein the generated light, for the simulation of incident X-ray quanta, has an energy above the band gap energy of the semiconductor layer. One embodiment includes at least one evaluation unit for calculating an evaluation signal from the electrical signals generated when the light is coupled into the semiconductor layer, and at least one calibration unit for calibrating at least one pulse discriminator on the basis of the evaluation signal. This provides the prerequisites for a rapidly repeatable calibration of the X-ray detector taking into account of the present polarization state without using X-ray radiation. Another embodiment additionally relates to a calibration method for such an X-ray detector.

19 Claims, 3 Drawing Sheets

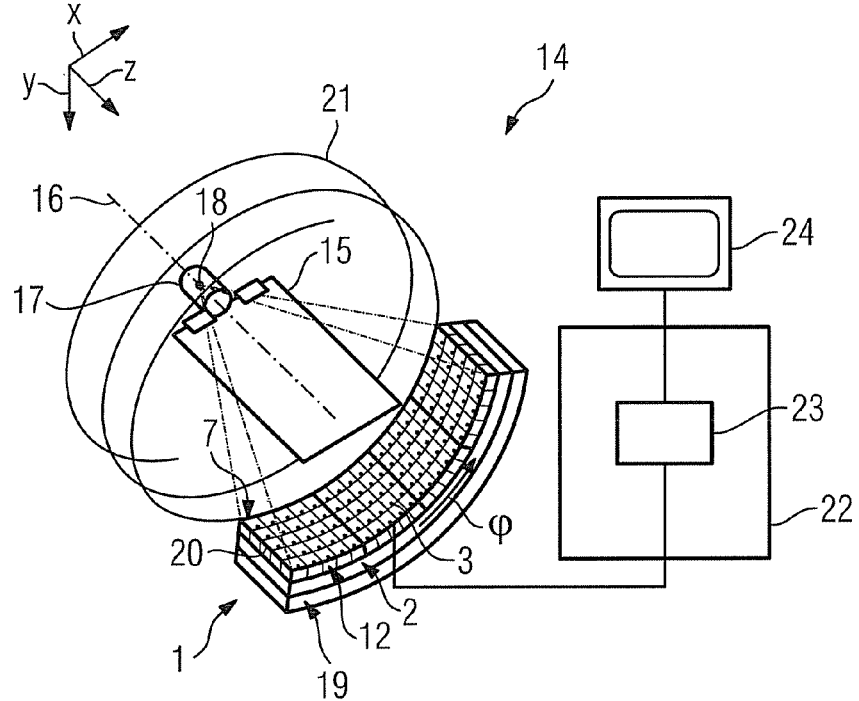
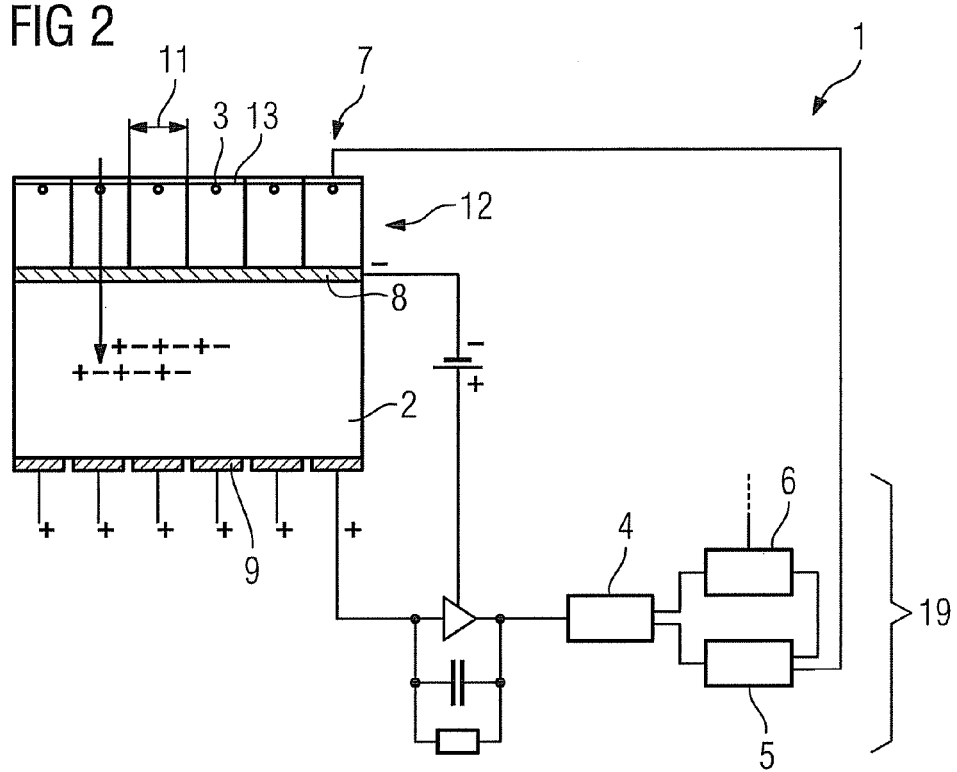

X-RAY DETECTOR COMPRISING A DIRECTLY CONVERTING SEMICONDUCTOR LAYER AND CALIBRATION METHOD FOR SUCH AN X-RAY DETECTOR

PRIORITY STATEMENT

The present application hereby claims priority under 35 U.S.C. §119 on German patent application number DE 10 2010 015 422.9 filed Apr. 19, 2010, the entire contents of which are hereby incorporated herein by reference.

FIELD

At least one embodiment of the invention generally relates to an X-ray detector comprising a directly converting semiconductor layer and/or a calibration method for such an X-ray detector.

BACKGROUND

X-ray detectors comprising a directly converting semiconductor layer enable individual X-ray quanta to be detected quantitatively and energy-selectively. In the case of this type of X-ray detectors, an incident X-ray quantum generates in the semiconductor layer, on account of in part multistage physical interaction processes with a semiconductor material, free charge carriers in the form of electron-hole pairs. By way of example, semiconductor materials in the form of CdTe, CdZnTe, CdTeSe, CdZnTeSe, CdMnTe, InP, TIBr2 or HGI2 are suitable for detecting X-ray quanta since these materials have a high X-ray absorption in the energy range of medical imaging.

In order to detect the quantum absorption events corresponding to an X-ray quantum, electrodes are fitted to the two sides of the semiconductor layer, a voltage being applied to the electrodes in order to generate an electric field. For the spatially resolved detection of the absorption events, one electrode is embodied in pixelated fashion and is designated as a read-out electrode. The electrode arranged opposite it is usually embodied in planar fashion and is designated as a counterelectrode. In the electric field generated, the liberated charge carriers are accelerated depending on type of charge and polarity to the electrodes, where they induce electrical signals in the form of currents. The currents are converted, by means of an evaluation unit, into an evaluation signal, the magnitude of which is proportional to the area integral of the current curve and thus proportional to that quantity of charge which is liberated by an incident X-ray quantum. The evaluation signal thus generated is subsequently conducted to a pulse discriminator, which, in a threshold-value-based manner, detects the X-ray quanta in a counting manner and/or energy-selectively.

A prerequisite for an error-free detection of X-ray quanta is a calibration of the X-ray detector that involves defining suitable threshold values. In this case, the threshold values are chosen such that a signal generated by noise does not initiate detection of a purported X-ray quantum, and that, in the case of an energy-selective detection, an energy or an energy range can be assigned to the individual X-ray quanta. Inhomogeneities in the material of the semiconductor layer make it necessary to carry out the calibration in spatially resolved fashion. In a first known calibration method, use is made of a radioactive preparation for irradiating the X-ray detector. In this case, the radioactive preparation liberates X-ray radiation having a known defined energy. Noise and energy thresholds for the pulse discriminator are determined by means of an evaluation of the detected electrical signals and of the evaluation signals derived therefrom. On account of in part legally established stipulations for the handling of radioactive preparations, this method is suitable only for a single calibration in the laboratory prior to assembly. However, it is not practicable in the assembled X-ray apparatus.

Since the material behavior of the semiconductor layer can vary over time and under the action of X-ray radiation and it is also necessary to take account of a drift of the evaluation electronics, it is necessary to repeat the calibration at certain time intervals and in an optimum case directly before the beginning of measurement. A calibration using X-ray radiation before the beginning of measurement is not considered since the patient would in this case be exposed to an additional X-ray dose. In a second known calibration method, for the purpose of repeatedly performing the calibration without the action of X-ray radiation, electrical signals are coupled capacitively onto the read-out electrode. This is then using a pulse generator that is electrically contact-connected to the counterelectrode. The pulse generator generates variable charges on the counterelectrode in such a way that electrical signals coupled in capacitively on the read-out electrode are generated with a pulse shape such as would be expected upon the incidence of an X-ray quantum having a specific energy.

Taking this as a departure point the intention is to provide an X-ray detector comprising a directly converting semiconductor layer and a calibration method for such an X-ray detector which provide in an improved form the prerequisites for a calibration of the X-ray detector that is repeatable directly before the beginning of measurement.

SUMMARY

In at least one embodiment, an X-ray detector is disclosed and also a calibration method is disclosed. Dependent claims relate to advantageous developments.

The pulse shapes of the electrical signals that correspond to the X-ray quanta incident in the semiconductor layer, in particular the pulse height and the pulse width, are considerably dependent on the polarization state of the semiconductor layer. Polarization in this context is understood to mean those effects which affect the charge carrier transport within the conductor layer. Polarization effects are responsible for a reduction of the charge carrier lifetime/mobility product (wc product) and thus for an increase in the average residence time in conjunction with a reduction of the lifetime of the charge carriers in the semiconductor material. Such effects are essentially caused by defects in the form of vacancies or interstitials during the production of the semiconductor layer. However, the polarization state of the semiconductor layer is not only dependent on production-dictated parameters. It is likewise dependent on the temperature of the semiconductor material, but also on the history of the X-ray radiation that has acted on the semiconductor layer. The polarization state is therefore temporally variable and is typically different between successive examinations, even before and after each individual examination.

The inventors have firstly recognized that an improved calibration of the X-ray detector can be obtained precisely when it is effected repeatedly taking account of the present polarization state of the semiconductor layer. This is the case in particular when the electrical signals are generated during the calibration process by means of charge carrier transport in the semiconductor layer. In the abovementioned known method for repeatable calibration, however, this is precisely not the case, since the electrical signals in the semiconductor layer are coupled in only capacitively, that is to say without charge carrier transport, onto the read-out electrode. The inventors have furthermore recognized that, by coupling light into the semiconductor layer, it is possible to generate charge carrier clouds such that they are like those charge carrier clouds which typically arise as a result of the interaction of an X-ray quantum having a specific energy with the semiconductor layer.

The use of light therefore enables the charge carrier transport initiated by an X-ray quantum to be simulated in a very realistic manner. A prerequisite for this is that light with an energy above a band gap energy of the semiconductor layer is used for generating free charge carriers.

Proceeding from these considerations, the X-ray detector according to at least one embodiment of the invention comprises

- a directly converting semiconductor layer for converting an incident radiation into electrical signals with a band gap energy characteristic of the semiconductor layer,
- at least one light source for coupling light into the semiconductor layer, wherein the generated light, for the simulation of incident X-ray quanta, has an energy above the band gap energy of the semiconductor layer,
- at least one evaluation unit for calculating an evaluation signal from the electrical signals generated when the light is coupled into the semiconductor layer, and
- at least one calibration unit for calibrating at least one pulse discriminator on the basis of the evaluation signal.

This X-ray detector therefore provides the prerequisites for an improved calibration since the electrical signals, as when an X-ray quantum is incident, are generated by transport of liberated charge carriers and are therefore also dependent on the instantaneous polarization state of the semiconductor layer. This construction therefore establishes, during the calibration, precisely the conditions such as arise when X-ray quanta are incident in the semiconductor layer. By choosing the wavelength of the light and the irradiation time, it is possible to generate in a targeted manner charge carrier clouds such as typically arise upon the incidence of an X-ray quantum with a specific energy. It is therefore possible to simulate in a highly targeted manner charge carrier transports and electrical signals corresponding thereto for X-ray quanta with different energies.

The calibration can be carried out at any time, that is to say also directly before and after an examination of a patient. This has the advantage that changes in the polarization state which are caused by the examination itself can be identified and used for the subsequent correction of the detected signals.

Moreover, the calibration is effected without using X-ray radiation and thus without an additional X-ray dose that is applied to the patient.

In one advantageous configuration of at least one embodiment of the invention, the semiconductor layer has pixels, wherein a light source, an evaluation unit, a calibration unit and a pulse discriminator are assigned to each of the pixels. This enables, in particular, a spatially resolved calibration of the X-ray detector.

The semiconductor layer is preferably arranged between a counterelectrode and a read-out electrode structured in pixel-like fashion, and wherein the counterelectrode and/or the read-out electrode are/is transparent or semitransparent at least in sections for the purpose of coupling in the light. In this way, the semiconductor layer can be irradiated in a simple manner from a direction that is the same in comparison with the X-ray radiation. The transparent or semitransparent property can be produced particularly simply if the counterelectrode and/or the read-out electrode are/is a thin metal layer.

In a further advantageous configuration of at least one embodiment of the invention, the counterelectrode and/or read-out electrode have/has cutouts. The light can thereby be coupled into the semiconductor layer in a targeted manner by way of a defined region. Moreover, the cutouts can be introduced into the known electrodes with very little outlay, without the function of the electrode being significantly impaired.

In this case, the cutouts are preferably embodied in strip-like fashion and extend over a central region of an active pixel area of the pixel. The strips are advantageously dimensioned such that the charge carrier clouds liberated by the light do not expand over the region of the read-out electrode of an individual pixel during charge carrier transport through the semiconductor layer. Crosstalk to adjacent pixels is thereby avoided.

In one development of at least one embodiment of the invention, the light source is an LED or a laser diode. Such light sources are cost-effective and readily available. They are suitable in particular for generating light having a defined, predeterminable wavelength. Moreover, they can be operated in pulsed fashion or continuously in order to liberate a specific quantity of charge in the semiconductor layer. By means of the type and duration of the irradiation it is possible in this way to simulate X-ray quanta with a specific energy in a targeted manner. VIS or IR light sources that generate VIS or IR radiation in a wavelength range at between 560 and 900 nm are suitable for liberating charge carriers in a II-VI semiconductor layer.

The X-ray detector according to at least one embodiment of the invention further preferably comprises a collimator, wherein the light source is arranged in a side wall or a collimator bridge of the collimator. This enables a very compact construction of the detector. Furthermore, the conventional measurements with X-ray radiation are not impaired by the components for calibrating the X-ray detector.

The calibration unit is preferably designed for setting at least one threshold value of the pulse discriminator. A noise threshold and/or an energy threshold are/is defined by the setting of the threshold value. The setting is, moreover, advantageously carried out on the basis of an evaluation of a plurality of evaluation signals.

A second aspect of at least one embodiment of the invention concerns a calibration method for an X-ray detector having a directly converting semiconductor layer for converting an incident radiation into electrical signals with a band gap energy characteristic of the semiconductor layer, comprising the following method steps:

a) generating light having an energy above the band gap energy of the semiconductor layer,
b) coupling the light into the semiconductor layer for the simulation of an incident X-ray quantum with a specific energy,
c) measuring an evaluation signal on the basis of electrical signals generated by the light, and
d) calibrating at least one pulse discriminator on the basis of the evaluation signal.

In one advantageous embodiment of the invention, the evaluation signal is formed from a convolution of the electrical signals in such a way that the evaluation signal is proportional to the energy of the radiation coupled in.

BRIEF DESCRIPTION OF THE DRAWINGS

The invention is explained in greater detail below on the basis of example embodiments and with reference to the drawings, in which:

FIG. 1 shows in a schematic illustration a computed tomography apparatus comprising an X-ray detector according to an embodiment of the invention, FIG. 2 shows in side view an excerpt from the X-ray detector according to an embodiment of the invention.

Figure 3:
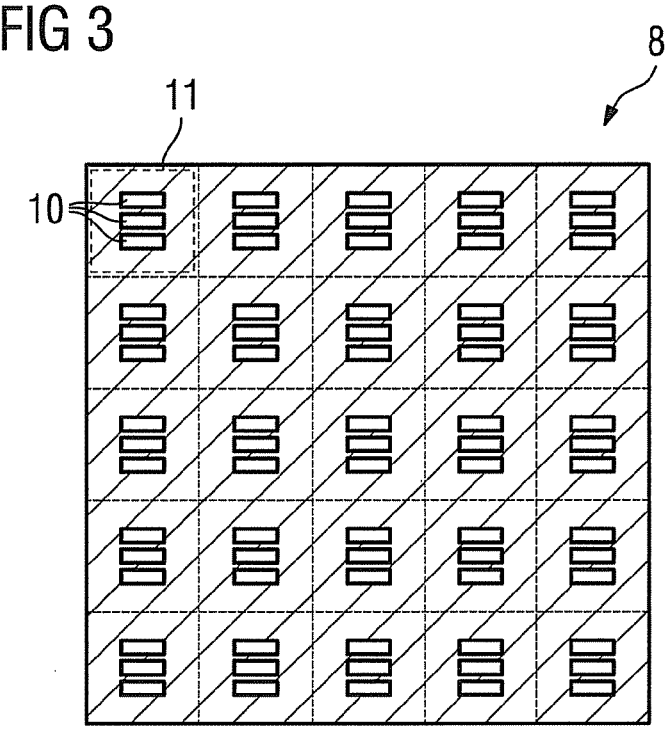
FIG. 3 shows in plan view a counterelectrode according to a first example embodiment with three strip-type cutouts to each pixel.

In the figures, identical or functionally identical elements are designated by the same reference symbols. In the case of recurring elements in a figure, only one element is respectively provided with a reference symbol for reasons of clarity. The illustrations in the figures are schematic and not necessarily true to scale, in which case scales can vary between the figures.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 illustrates a computed tomography apparatus 14 comprising an X-ray detector 1 according to an embodiment of the invention in partly perspective, partly block-diagram-like view. The computed tomography apparatus 14 comprises a patient supporting couch 15 for supporting a patient to be examined. It furthermore comprises a gantry (not illustrated) with a recording system 17, 1 mounted such that it is rotatable about a system axis 16. The recording system 17, 1 has an X-ray tube 17 and the X-ray detector 1 according to an embodiment of the invention, which are oriented opposite one another in such a way that an X-ray radiation emerging from the focus 18 of the X-ray tube 17 during operation impinges on the X-ray detector 1. The X-ray detector 1, which is illustrated in more precise detail in a side view in FIG. 2, comprises a collimator 12 with light sources in the form of IR light sources 3 integrated therein, a directly converting semiconductor layer 2 and read-out electronics 19 situated downstream in the beam direction. The X-ray detector 1 has a plurality of pixels 7 or detector elements which are lined up in the $\phi$ direction and grouped into modules 20. X-ray quanta are therefore countable and/or energy-selectively detectable in a spatially resolved manner.

For recording an image of an examination region, upon rotation of the recording system 17, 1 about the system axis 16, projections from a multiplicity of different projection directions are detected, wherein, for each projection, for each pixel 7, the X-ray detector 1 supplies electrical signals from which raw image data are generated in a counting manner and optionally in an energy-selective manner. In the case of spiral scanning, by way of example, a continuous adjustment of the patient supporting couch 15 in the direction of the system axis is effected simultaneously during a rotation of the recording system 17, 1. In the case of this type of scanning, therefore, the X-ray tube 17 and the X-ray detector 1 move on a helical path 21 around the patient. The raw image data generated are serialized in a sequencer and subsequently transmitted to an image computer 22. The image computer 22 contains a reconstruction unit 23, which reconstructs from the raw image data an image, e.g. in the form of a slice image of the patient, according to a method known per se to the person skilled in the art. The image can be displayed on a display unit 24, e.g. a video monitor, connected to the image computer 22.

An excerpt from the X-ray detector 1 according to an embodiment of the invention can be seen in side view in FIG. 2. The directly converting semiconductor layer 2 is produced from a CdZnTe compound. This semiconductor material has high X-ray absorption in the energy range of medical imaging and has a band gap energy that is large enough to separate liberated charge carriers in an electric field. Besides a CdZnTe compound, by way of example, CdTe, CdTeSe, CdZnTeSe, CdMnTe, InP, TIBr2 or HGI2 compounds could also be used for the construction of the semiconductor layer 2.

The semiconductor layer 2 is arranged between a counterelectrode 8 and a read-out electrode 9 structured in pixel-like fashion. A voltage for establishing an electric field is applied to the electrodes 8, 9, in which electric field charge carriers liberated by radiation absorption events are accelerated in the direction of the electrodes 8, 9. In this example embodiment, liberated electrons are accelerated in the direction of the positively charged read-out electrode 9, where they induce electrical signals in the form of currents.

The currents are forwarded to read-out electronics 19 comprising, for each pixel 7, an evaluation unit 4, a pulse discriminator 6 and a calibration unit 5.

In the evaluation unit 4, the current pulse is converted by convolution into an evaluation signal, the pulse height with which is proportional to the area beneath the current curve and thus proportional to the detected quantity of charge. The evaluation signal is subsequently passed to a pulse discriminator 6 in the examination operating mode, said pulse discriminator detecting detection events in a counting manner by way of a comparison of a pulse height of the evaluation signal with a threshold value that can be set. The pulse discriminator 6 can be designed for energy-selective detection also for a plurality of threshold value comparison operations with threshold values that can be set differently. In this way, energies or energy ranges can be assigned to the detection events. The energy-selective detection enables, in particular, a material-specific evaluation of images.

For the calibration of the X-ray detector 1, IR light sources 3 are integrated in the collimator bridges 13 of the collimator 12, the IR light sources being arranged for irradiating the semiconductor layer 2 with IR radiation. The IR light sources 3 generate an IR radiation with an energy above the band gap energy of the semiconductor layer. In this example embodiment, the IR light sources 3 are designed for generating IR radiation having different wavelengths or energies and can be operated both continuously and in pulsed fashion. In order to couple the IR radiation into the semiconductor layer 2, the counterelectrode 8 is formed from a thin metal layer which is virtually transparent in the wavelength range of the IR radiation generated. In this way, the IR radiation quanta coupled into the semiconductor layer 2 generate charge carriers in the form of electron-hole pairs. By predetermining the wavelength of the IR radiation, and the duration of the irradiation, and by predetermining pulsed or continuous operation of the IR light source 3, it is possible to generate charge carrier clouds which correspond to those of incident X-ray quanta having a defined energy.

In the calibration operating mode, the evaluation signal is forwarded to a calibration unit 5. The calibration unit 5 determines, from at least one evaluation signal, at least one threshold value for detection of the X-ray quanta simulated by the IR radiation. The threshold values are subsequently fed to the pulse discriminator 6 for a subsequent measurement. In the present exemplary embodiment, a light source 3, an evaluation unit 4, a calibration unit 5 and a pulse discriminator 6 are assigned to each of the pixels 7. It would also be possible, of course, for individual components from among these components to be assigned to pixel groups. This therefore means, in particular, that a light source can also irradiate a plurality of pixels.

A further embodiment resides in generating IR radiation on the evaluation electronics 19 and coupling it, if appropriate, via a corresponding light-transmissive underfill into the semiconductor layer 2. In this case, the coupling-in can either be effected via regions of the pixelated read-out electrode 9 that remain free. It would also be conceivable for the read-out electrode 9 to be a thin metal layer and thus transparent or semitransparent to the IR radiation. The IR radiation source 3 can also be grown or deposited as an LED onto the read-out electronics 19 or be mechanically connected thereto. However, the IR light sources 3 can also be arranged in a different arrangement with respect to the X-ray detector 1, for example at the edge of the read-out electronics 19.

Figure 4:
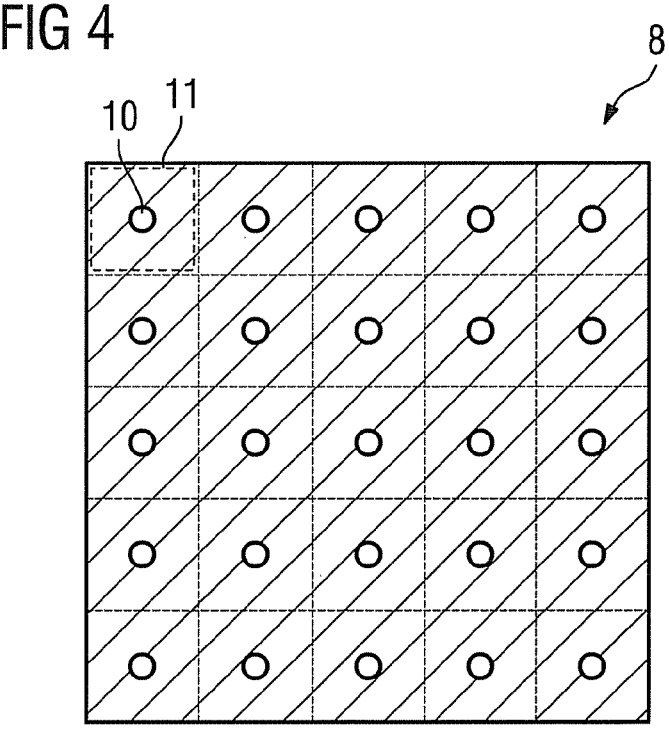
FIG. 4 shows in plan view a counterelectrode according to a second example embodiment with a circular cutout for each pixel.
Figure 5:
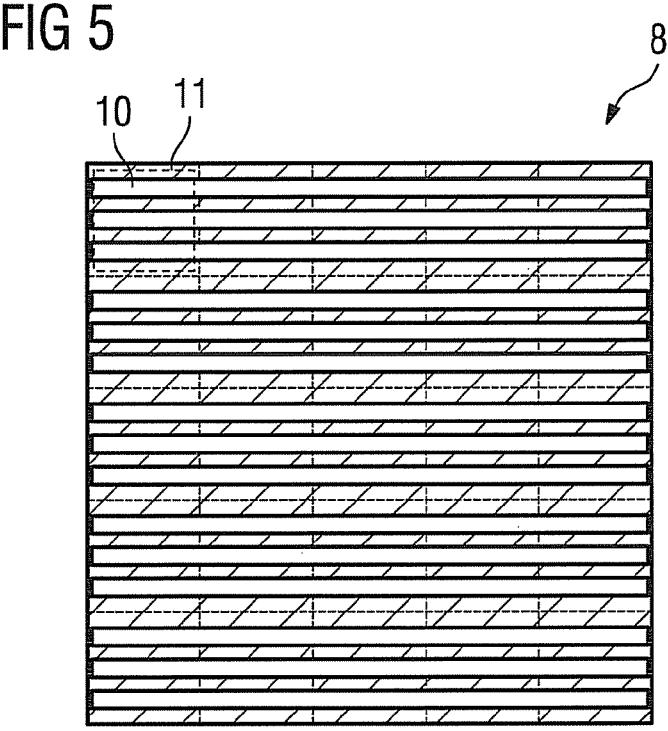
FIG. 5 shows in plan view a counterelectrode according to a third example embodiment with cross-pixel strip-type cutouts.

The IR radiation can also be coupled into the semiconductor layer 2 by virtue of the counterelectrode 8 and/or the read-out electrode 9 having a cutout 10 through which the IR radiation can pass into the semiconductor layer 2. FIG. 3 shows in a plan view a counterelectrode 8 according to a first exemplary embodiment, in which three strip-type cutouts are arranged centrally relative to each pixel. FIG. 4 reveals in a plan view a counterelectrode according to a second example embodiment, in which a circular cutout is provided centrally relative to a respective active pixel area 11. In this case, the dimensioning of the cutout 10 is chosen such that the charge carrier clouds expanded by charge carrier transport do not impinge on adjacent pixels or active pixel areas 11. Consequently, crosstalk to adjacent pixels is therefore avoided. FIG. 5 shows in a plan view a counterelectrode 8 according to a third exemplary embodiment with cross pixel strip-type cutouts 10.

It should be pointed out that, instead of an IR light source, a VIS light source can be used as the light source 3 and, consequently, instead of an IR radiation, a VIS radiation can be used for liberating charge carriers.

Figure 6:
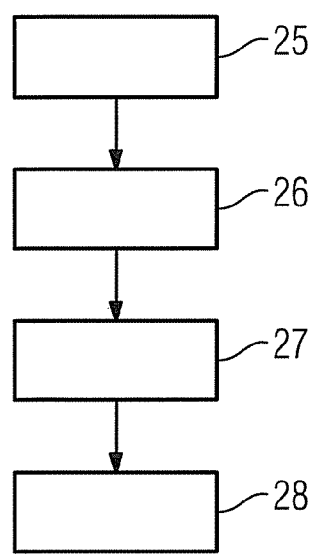
FIG. 6 shows a calibration method according to an embodiment of the invention in an illustration in the manner of a block diagram.

FIG. 6 illustrates the calibration method for an X-ray detector 1 in the manner of a block diagram. The calibration method comprises the following method steps:

a) generating 25 light having an energy above the band gap energy of the semiconductor layer 2, b) coupling 26 the light into the semiconductor layer 2 for the simulation of an incident X-ray quantum with a specific energy, c) measuring 27 an evaluation signal on the basis of electrical signals generated by the light, and d) calibrating 28 at least one pulse discriminator 6 on the basis of the evaluation signal.

To summarize, the following can be stated:

An embodiment of the invention relates to an X-ray detector 1, comprising a directly converting semiconductor layer 2 for converting an incident radiation into electrical signals with a band gap energy characteristic of the semiconductor layer 2, and at least one light source 3 for coupling light into the semiconductor layer 2, wherein the generated light, for the simulation of incident X-ray quanta, has an energy above the band gap energy of the semiconductor layer 2. It furthermore comprises at least one evaluation unit 4 for calculating an evaluation signal from the electrical signals generated when the light is coupled into the semiconductor layer 2, and at least one calibration unit 5 for calibrating at least one pulse discriminator 6 on the basis of the evaluation signal. This provides the prerequisites for a rapidly repeatable calibration of the X-ray detector 1 taking account of the present polarization state without using X-ray radiation. The invention additionally relates to a calibration method for such an X-ray detector 1.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An X-ray detector, comprising:
   a directly converting semiconductor layer to convert an incident radiation into electrical signals with a band gap energy characteristic of the semiconductor layer;
   at least one light source to couple light into the semiconductor layer, wherein the generated light, for the simulation of incident X-ray quanta, has an energy above the band gap energy of the semiconductor layer;
   at least one evaluation unit to calculate an evaluation signal from the electrical signals generated when the light is coupled into the semiconductor layer; and
   at least one calibration unit to calibrate at least one pulse discriminator on a basis of the evaluation signal.

2. The X-ray detector as claimed in claim 1, wherein the semiconductor layer includes pixels and a light source, an evaluation unit, a calibration unit and a pulse discriminator being assigned to each of the pixels.

3. The X-ray detector as claimed in claim 2, wherein the semiconductor layer is arranged between a counterelectrode and a read-out electrode structured in pixel-like fashion, and wherein at least one of the counterelectrode and the read-out electrode is transparent or semitransparent at least in sections for the purpose of coupling in the light.

4. The X-ray detector as claimed in claim 2, wherein the at least one of the counterelectrode and the read-out electrode is a thin metal layer.

5. The X-ray detector as claimed in claim 1, wherein the semiconductor layer is arranged between a counterelectrode and a read-out electrode structured in pixel-like fashion, and wherein at least one of the counterelectrode and the read-out electrode is transparent or semitransparent at least in sections for the purpose of coupling in the light.

6. The X-ray detector as claimed in claim 5, wherein the at least one of the counterelectrode and the read-out electrode is a thin metal layer.

7. The X-ray detector as claimed in claim 6, wherein the at least one of the counterelectrode and the read-out electrode has cutouts.

8. The X-ray detector as claimed in claim 7, wherein the cutouts are embodied in strip-like fashion and extend over a central region of an active pixel area of the pixel.

9. The X-ray detector as claimed in claim 5, wherein the at least one of the counterelectrode and the read-out electrode has cutouts.

10. The X-ray detector as claimed in claim 9, wherein the cutouts are embodied in strip-like fashion and extend over a central region of an active pixel area of the pixel.

11. The X-ray detector as claimed in claim 1, wherein the at least one light source is an IR or VIS light source.

12. The X-ray detector as claimed in claim 11, wherein the at least one light source is an LED or a laser diode.

13. The X-ray detector as claimed in claim 1, comprising a collimator, wherein the at least one light source is arranged in a side wall or a collimator bridge of the collimator.

14. The X-ray detector as claimed in claim 1, wherein the at least one calibration unit is designed for setting at least one threshold value of the pulse discriminator.

15. A calibration method for an X-ray detector including a directly converting semiconductor layer for converting an incident radiation into electrical signals with a band gap energy characteristic of the semiconductor layer, the method comprising:
generating light having an energy above the band gap energy of the semiconductor layer;
coupling the light into the semiconductor layer for the simulation of an incident X-ray quantum with a specific energy;
measuring an evaluation signal on the basis of electrical signals generated by the light; and
calibrating at least one pulse discriminator on a basis of the evaluation signal.

16. The calibration method as claimed in claim 15, wherein at least one threshold value of the pulse discriminator is set during the calibrating.

17. The calibration method as claimed in claim 16, wherein, during the measuring, the evaluation signal is formed from a convolution of the electrical signals in such a way that the evaluation signal is proportional to the energy of the radiation coupled in.

18. The calibration method as claimed in claim 15, wherein, during the measuring, the evaluation signal is formed from a convolution of the electrical signals in such a way that the evaluation signal is proportional to the energy of the radiation coupled in.

19. A tangible computer readable medium including program segments for, when executed on a computer device, causing the computer device to implement the method of claim 15.

* * * * *